United States Patent
Kidmose et al.

(10) Patent No.: US 12,253,064 B2
(45) Date of Patent: Mar. 18, 2025

(54) METHOD FOR CONTROLLING BOOSTED POWER OUTPUT OF A POWER GENERATING UNIT

(71) Applicant: VESTAS WIND SYSTEMS A/S, Aarhus N. (DK)

(72) Inventors: Jacob Quan Kidmose, Risskov (DK); Mu Wei, Solbjerg (DK); Manas Patankar, Glen Huntly (AU)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 311 days.

(21) Appl. No.: 17/764,758

(22) PCT Filed: Sep. 14, 2020

(86) PCT No.: PCT/DK2020/050249
§ 371 (c)(1),
(2) Date: Mar. 29, 2022

(87) PCT Pub. No.: WO2021/063460
PCT Pub. Date: Apr. 8, 2021

(65) Prior Publication Data
US 2022/0349379 A1    Nov. 3, 2022

(30) Foreign Application Priority Data
Sep. 30, 2019    (DK) .......................... PA 2019 70609

(51) Int. Cl.
*F03D 7/04*    (2006.01)
*F03D 7/02*    (2006.01)

(52) U.S. Cl.
CPC ......... *F03D 7/0284* (2013.01); *F03D 7/0224* (2013.01); *F05B 2260/8211* (2013.01);
(Continued)

(58) Field of Classification Search
CPC ...... F03D 7/0284; F03D 7/0224; F03D 7/048; F03D 7/0276; F03D 7/043; F03D 7/044;
(Continued)

(56) References Cited

U.S. PATENT DOCUMENTS 10,181,101 B2 *    1/2019    Zhang ..................... F03D 7/048
11,506,174 B2 *    11/2022    Yu ........................... F03D 7/043
(Continued)

FOREIGN PATENT DOCUMENTS

EP    2719894 A2    4/2014
EP    2461024 B1 *    8/2019    ............. F03D 7/028
(Continued)

OTHER PUBLICATIONS

Danish Patent and Trademark Office, 1st Technical Examination including The Search Report and The Search Opinion for Application PA 2019 70609 dated Feb. 17, 2020.
(Continued)

*Primary Examiner* — Yongjia Pan
(74) *Attorney, Agent, or Firm* — Patterson + Sheridan, LLP

(57) ABSTRACT

A method for controlling a power output of a power generating unit is disclosed. An accumulated power output of the power generating unit during a predefined time interval is forecasted. An actual power output of the power generating unit is measured during the predefined time interval, and an actual accumulated power output is estimated for the predefined time interval on the basis of the measured actual power output of the power generating unit. A difference between the forecasted accumulated power output and the estimated actual accumulated power output is derived. The power output of the power generating unit is boosted, in the case that the estimated actual accumulated power output is below the forecasted accumulated power output, and the
(Continued)

difference between the forecasted accumulated power output and the estimated actual accumulated power output is larger than a predefined threshold value.

15 Claims, 7 Drawing Sheets

(52) U.S. Cl.
CPC . *F05B 2270/1033* (2013.01); *F05B 2270/335* (2013.01); *F05B 2270/337* (2013.01)

(58) Field of Classification Search
CPC .......... F03D 7/046; F03D 7/045; F03D 7/047; F03D 17/021; F03D 17/00; F03D 7/0272; F05B 2260/8211; F05B 2270/1033; F05B 2270/335; F05B 2270/337; F05B 2270/1016; F05B 2270/00; Y02E 10/72; Y02E 10/70; Y02E 10/74; H02P 9/008; H02P 2101/15; H02P 9/00; G05B 15/00; G05B 15/02; G05B 17/00; G05B 17/02; G05B 19/00

See application file for complete search history.

(56) References Cited

U.S. PATENT DOCUMENTS

| | | | | |
|---|---|---|---|---|
| 2002/0084655 | A1* | 7/2002 | Lof | F03D 7/048 290/44 |
| 2005/0234599 | A1* | 10/2005 | Kurokami | H02J 3/32 700/286 |
| 2009/0055030 | A1* | 2/2009 | Mayor | F03D 7/0284 700/287 |
| 2011/0144816 | A1* | 6/2011 | Morjaria | F03D 7/048 700/287 |
| 2011/0204635 | A1* | 8/2011 | Miller | F03D 7/048 290/44 |
| 2011/0270450 | A1* | 11/2011 | Gujjar | G06Q 10/00 290/44 |
| 2013/0046492 | A1* | 2/2013 | Westergaard | H02J 3/004 702/60 |
| 2015/0094870 | A1* | 4/2015 | Fornage | G05B 13/026 700/291 |
| 2016/0181811 | A1* | 6/2016 | Liu | F03D 9/11 307/20 |
| 2016/0258361 | A1* | 9/2016 | Tiwari | G06Q 10/06 |
| 2018/0187650 | A1* | 7/2018 | Byreddy | F03D 7/028 |
| 2018/0223804 | A1* | 8/2018 | Badrinath Krishna | F03D 7/048 |
| 2018/0268581 | A1* | 9/2018 | Demuth | F03D 7/048 |
| 2018/0340515 | A1* | 11/2018 | Huyn | F03D 17/00 |
| 2019/0170118 | A1* | 6/2019 | Kiles | G05B 19/042 |
| 2019/0203696 | A1* | 7/2019 | Kaucic | F03D 7/046 |
| 2020/0056589 | A1* | 2/2020 | Evans | F03D 7/048 |

FOREIGN PATENT DOCUMENTS

| | | | | |
|---|---|---|---|---|
| FR | 3074975 | A1 * | 6/2019 | ........... F03D 7/0284 |
| RU | 2596904 | C2 * | 9/2016 | ............. F03D 7/048 |
| WO | 2015120856 | A1 | 8/2015 | |
| WO | 2017054822 | A1 | 4/2017 | |
| WO | 2017059862 | A1 | 4/2017 | |
| WO | WO-2019007631 | A1 * | 1/2019 | ............. H02J 3/003 |
| WO | 2021063460 | A1 | 4/2021 | |

OTHER PUBLICATIONS

PCT, Notification of Transmittal of The International Search Report and The Written Opinion of The International Searching Authority, or The Declaration for Application PCT/DK2020/050249 dated Nov. 13, 2020.

* cited by examiner

METHOD FOR CONTROLLING BOOSTED POWER OUTPUT OF A POWER GENERATING UNIT

FIELD OF THE INVENTION

The present invention relates to a method for controlling a power output of a power generating unit, such as a wind turbine. More particularly, the method according to the invention ensures forecasted power outputs to be reached without unduly loading the power generating unit. Furthermore, the present invention relates to a renewable power plant comprising at least one power generating unit which is controlled in accordance with such a method.

BACKGROUND OF THE INVENTION

Forecasting of load demand and/or power production in a power grid has been used by transmission system operators to ensure reliability of supply and demand as the basis for operating power systems. In order to allow a transmission system operator to appropriately manage the power grid, independent power producers in the electricity market, such as wind farm owners must provide forecasts to the transmission system operator, regarding an accumulated power production that the independent power producer expects to be able to provide to the power grid during a predefined future time interval. If the forecast is not reached, the independent power producer will often be penalised by the transmission system operator.

Thus, the independent power producers have a significant interest in providing an actual produced power which is in accordance with the forecast of power. The difference between the forecast of power and an actual produced power is sometimes referred to as a forecast error.

DESCRIPTION OF THE INVENTION

It is an object of embodiments of the invention to provide a method for controlling a power output of a power generating unit, in which forecast errors are reduced without inflicting excessive fatigue loads on the power generating unit.

According to a first aspect the invention provides a method for controlling a power output of a power generating unit, the method comprising the steps of:
 forecasting an accumulated power output of the power generating unit during a predefined time interval,
 measuring an actual power output of the power generating unit during the predefined time interval,
 estimating an actual accumulated power output for the predefined time interval on the basis of the measured actual power output of the power generating unit,
 deriving a difference between the forecasted accumulated power output and the estimated actual accumulated power output, and
 boosting the power output of the power generating unit, in the case that the estimated actual accumulated power output is below the forecasted accumulated power output, and the difference between the forecasted accumulated power output and the estimated actual accumulated power output is larger than a predefined threshold value.

Thus, according to the first aspect, the invention provides a method for controlling a power output of a power generating unit. In the present context the term 'power generating unit' should be interpreted to mean a unit which is capable of generating electrical power, and which supplies all or part of the produced power to a power grid. The power generating unit may be a renewable power generating unit, such as a wind turbine, a photovoltaic cell, etc.

In the present context the term 'power grid' should be interpreted to mean an interconnected electrical network for delivering electrical power from producers to consumers. Furthermore, the power grid may have different topologies, Examples of such topologies are, e.g., radial power grids and meshed power grids.

In the method according to the first aspect of the invention, an accumulated power output of the power generating unit during a predefined time interval is initially forecasted. Thus, it is estimated how much energy the power generating unit expects to be able to supply to the power grid during a specific future time interval. It may, e.g., be based on a given set of expected conditions, for instance ambient conditions, such as meteorological forecasts, fatigue levels of the power generating unit, requirements from the transmission system operator, etc.

The meteorological forecast may be a prediction of the conditions of the atmosphere for a given location and time. Furthermore, the meteorological forecast may depend on a number of variables such as temperature, air pressure, humidity, precipitation, wind speed, wind direction, solar influx, etc.

The fatigue level is a measure of weakness in materials caused by repeated variations of stress. Components which are subjected to repeated loads, e.g. in the form of bending, such as rotor blades, towers, drive trains, etc., of a wind turbine generator, build up a fatigue level which may eventually cause damage or break down of the component. Components are often designed to have a specific lifetime, and the fatigue level of a component should ideally correspond to its present 'age'. If a component has a fatigue level which is higher than expected, it may be desirable to reduce the fatigue causing loads on that component. On the other hand, if a component has a fatigue level which is lower than expected, this component can be loaded more without decreasing the expected lifetime below the design lifetime.

The predefined time interval may be defined by different time scales, ranging from few minutes to several days. For instance, the predefined time interval may have a duration of the order of hours, such as 1-10 hours. The predefined time interval may start immediately, or it may be a time interval in the future, for instance an upcoming week.

Next, an actual power output of the power generating unit during the predefined time interval is measured. The measurements may be performed by direct measurements, e.g. by means of power meters. As an alternative, the power output may be derived from measuring other parameters, which could be measured. For instance, by measuring a voltage and a current of the power generating unit, it is possible to derive the power output.

Thus, the power output which is actually produced by the power generating unit and provided to the power grid is monitored during the predefined time interval, and preferably reviewed in view of the forecasted accumulated power output, in order to determine whether or not the produced power output follows the forecast.

Next, an actual accumulated power output for the predefined time interval is estimated on the basis of the measured actual power output of the power generating unit. In the present context, the term 'actual accumulated power output' should be interpreted to mean an estimation of the expected total power production of the power generating unit during the predefined time interval, i.e. a total amount of power, which it is expected that the power generating unit is able to produce during the entire predefined time interval. This estimation is performed on the basis of the actual power being produced by the power generating unit, during the predefined time interval. Accordingly, the estimation is performed at a point in time which is within the predefined time interval, i.e. after the predefined time interval has commenced, but before the predefined time interval has ended, and it is based on the power which has already been produced so far, and power production provided at the time of performing the estimation.

At any given time during the predefined time interval, an accumulated power, which has already been produced since the start of the predefined time interval can be derived from the measured actual power output of the power generating unit. The actual accumulated power output for the entire predefined time interval can then be estimated by estimating how much power the power generating unit is expected to produce during the remaining part of the predefined time interval and add this to the power which has already been produced. The estimated part could, e.g., be equal to the part of the forecasted accumulated power output which corresponds to the remaining part of the predefined time interval.

Alternatively or additionally, the estimation of the actual accumulated power output for the remaining part of the predefined time interval may, e.g., depend on meteorological forecasts, i.e. meteorological forecasts of the expected meteorological conditions, such as temperature, air pressure, humidity, precipitation, wind speed, wind direction, etc., during the remaining part of the predefined time interval at and around the area of the power generating unit.

In the case that the power generating unit is a wind turbine generator, the power generation is dependent on the wind conditions, notably the wind speed and the wind direction. Thus, meteorological forecasts related to the wind speed and wind direction at the position of the wind turbine generator may be important for forecasting the actual accumulated power output of the wind turbine generator. For instance, if low wind speeds are expected, the power production is also expected to be low, and expected wind speeds above rated wind speed results in an expected power production corresponding to rated power. Furthermore, expected wind speeds above a cut-out wind speed results in expected zero production, since the wind turbine will, in this case, have to be shut down.

Other relevant considerations, which are expected to influence the power production during the remaining part of the predefined time interval, may also be taken into account.

Thus, the estimated actual accumulated power output is a measure for the expected total power output of the power generating unit during the entire predefined time interval, but it takes the power which has already been produced since the start of the predefined time interval into account. The closer in time to the end of the predefined time interval, the more accurate the estimated actual accumulated power is expected to be.

Next, a difference between the forecasted accumulated power output and the estimated actual accumulated power output is derived. The difference between the forecasted accumulated power output and the estimated actual accumulated power output is a measure of how much an expected total power production differs from a forecasted power production. Thus, the difference may give an indication of how far the estimated actual accumulated power output is from the forecasted accumulated power output, and thereby an indication regarding whether or not it may be expected to fulfil the forecast within the predefined time interval. Furthermore, the difference indicates whether the estimated accumulated power output is above or below the forecasted accumulated power output.

In the case that the estimated actual accumulated power output is larger than the forecasted accumulated power output, the expected total power production is above what was forecasted, and thus there is surplus of power production. Thus, unless something is changed, it may be expected that the power generating unit, at the end of the predefined time interval, has provided a total power output which is above what was forecasted. In this case the power generating unit may simply continue to operate in the manner in which it has been operated until now, thereby reaching a larger accumulated power output than forecasted, and the surplus power production can be sold at market price.

As an alternative, the power generating unit may be operated to provide a reduced power production during the remaining part of the predefined time interval, thereby reaching an accumulated power production which is closer to the forecasted accumulated power production. This results in reduced wear and fatigue loads on the power generating unit, thereby possibly prolonging the expected lifetime of the power generating unit. Furthermore, this may also allow the power generating unit to be operated in a manner which increases the fatigue level, e.g. in order to increase the power production, if this is required at a later point in time, without decreasing the lifetime of the power generating unit below the design lifetime.

Furthermore, operating the power generating unit at reduced power production allows the power generating unit to have a spinning reserve, which is the extra generating capacity that is available by increasing the power output of the power generating unit. Such a spinning reserve is valuable because a transmission system operator will be willing to pay power producers for making spinning reserves available, since spinning reserves can be activated in order to support the power grid, e.g. in the case of a fault or contingency in the power grid.

In the case that the estimated actual accumulated power output is below the forecasted accumulated power output, the expected total power production is below what was forecasted, and thus there is a deficiency in the power production, and the forecasted power output may not be met. This may lead to penalties, as described above, in particular if the difference is large. It may therefore, in this case, be advantageous to increase the power production during the remaining part of the predefined time interval, in order avoid penalties, and in order to fulfil obligations towards the power grid.

Thus, the difference is a measure for the expected difference between the forecasted accumulated power output and the estimated actual accumulated power output of the power generating unit by the end of the predefined time interval, and provides an indication regarding whether or not it is likely that the forecasted power output, with regard to the entire predefined time interval, is met.

Finally, the power output of the power generating unit is boosted, in the case that the estimated actual accumulated power output is below the forecasted accumulated power output, and the difference between the forecasted accumulated power output and the estimated actual accumulated power output is larger than a predefined threshold value.

As described above, if there is a large deficiency between the forecasted accumulated power output and the actual accumulated power output at the end of the predefined time interval, this may lead to penalties. Furthermore, if the estimated actual accumulated power output is well below the forecasted accumulated power output, this is an indication that the actual accumulated power output will not reach the forecasted accumulated power output, and that there is therefore a risk that penalties will be incurred.

Therefore, in order to avoid these penalties, the power output of the power generating unit may be boosted during the remaining part of the predefined time interval when such a situation occurs, and this is the case if the estimated actual accumulated power output is below the forecasted accumulated power output, and the difference is larger than a predefined threshold value. Thereby the predefined threshold value defines an upper limit on the size of the difference between the forecasted accumulated power output and the estimated actual accumulated power output, which represents the largest acceptable deficiency before the boosting of the power generating units is triggered/started. For instance, the threshold value may represent a deficiency which will not result in penalties, or which will only result in acceptable penalties.

Thereby, it is ensured that the difference has to be sufficiently large before the power output of the power generating unit is boosted. Thus, the power output of the power generating unit is only boosted for differences which are too large. Thereby, obligations towards the power grid may be fulfilled, and the penalties may be avoided.

The boosting operation may be provided with a hysteresis around the predefined threshold value or a timer applied on the boosting operation. The hysteresis may be zero or non-zero, and the timer may also be zero or non-zero. The purpose of using the hysteresis or the timer is to ensure the boosting operation does not bring sudden consecutive increase and decrease of the plant power output, which may bring disturbance to the power grid.

In the present context the term 'boosting of the power output of the power generating unit' should be interpreted to mean boosting the power output of the power generating unit above a usual maximum allowable power output. In the case that the power generating unit is a wind turbine generator, the boosted power output may correspond to a power output, in which the wind turbine generator extracts power from the wind, above a maximum power output, for instance above a nominal power output, in which the wind turbine generator experiences increased loads that would not have been allowed at the initial setting.

Thus, the power output of the power generating unit is only boosted in the case that the estimated actual accumulated power output is below the forecasted accumulated power output, and the difference between the forecasted accumulated power and the estimated actual accumulated power output is above the threshold value.

It is an advantage that the power output of the power generating unit is boosted only when it is required, because thereby, it is ensured that obligations towards the power grid may be fulfilled, and the penalties may be avoided, without inflicting excessive fatigue loads on the power generating unit. The difference is a fast and reliable manner of indicating whether or not it is likely that the forecasted power output is met. Furthermore, since the decision regarding whether or not to boost the power output is made based on the estimated actual accumulated power output obtained before the predefined time interval has lapsed, it is possible to avoid forecast error, because the power production can be increased for the remaining part of the predefined time interval, thereby closing the gap between the actual power production and the forecast.

In the case that the expected total power production is above what was forecasted the surplus power production can be sold at market price or the power generating unit may be operated to provide a reduced power production during the remaining part of the predefined time interval, and thereby prolonging the expected lifetime of the power generating unit. By reducing the power output of the power generating unit, the power generating unit is allowed to have a spinning reserve, which can be used by transmission system operators in case of an imbalance between load and generation. In the case that the expected total power production is below what was forecasted, the power output of the power generating unit is boosted during the remaining part of the predefined time interval. Thereby, the power generating unit is capable of providing a power output during a predefined time interval, which is in accordance with a forecasted accumulated power output of the power generating unit during the same predefined time interval, which in turn allows the forecast error to be reduced.

The power generating unit may be a wind turbine generator. A wind turbine generator is a power generating unit that converts mechanical rotational power produced by the wind to electrical power. The wind turbine generator will normally have a tower carrying a nacelle, the nacelle carrying a rotor and a set of wind turbine blades mounted thereon. The nacelle may comprise electrical devices, such as a generator, power electronics, etc. The nacelle may further be mounted on top of the tower, but may also be mounted on other parts of the tower, e.g. in the case that the wind turbine is a multirotor wind turbine comprising two or more rotors. The wind turbine generator may be a stand alone wind turbine generator, or it may form part of a wind farm comprising two or more wind turbines generators. Alternatively, the power generating unit may be in the form of another kind of renewable power generating unit, such as one or more photovoltaic cells, a hydroelectric generator, etc.

The step of forecasting an accumulated power output may be based on meteorological forecasts at the position of the wind turbine generator. The meteorological forecast may be a prediction of the conditions of the atmosphere at the position of the wind turbine generator and during the predefined time interval. Furthermore, the meteorological forecast may depend on a number of variables such as temperature, air pressure, humidity, precipitation, wind speed and wind direction, solar influx, etc.

For wind turbine generators, the power production is dependent on the weather conditions, in particular wind conditions, such as the wind speed and the wind direction. Thus meteorological forecasts related to the wind speed and wind direction at the position of the wind turbine generator may be important for forecasting the accumulated power output of the wind turbine generator. It is therefore an advantage to base such forecasting on meteorological forecasts which predict the weather condition at the site and during the time interval in question.

The step of boosting the power output may comprise changing a pitch control strategy of the wind turbine generator. The purpose of the pitch control strategy is to control a pitch angle of the wind turbine blades, i.e. the angular position of the wind turbine blades about an axis arranged longitudinally with respect to the wind turbine blade, in order to achieve a certain power output and follow a given power curve. Changing the pitch angle changes the angle of attack between the wind turbine blade and the incoming wind, thereby changing the ability of the wind turbine for extracting energy from the wind.

By changing the pitch control strategy of the wind turbine generator, the pitch is controlled in accordance with a changed power curve. For instance, a pitch control strategy can be selected, in which the wind turbine is operated above the design nominal power at wind speeds above the nominal wind speed, thereby increasing the power production. In order to obtain this, a more aggressive pitch strategy must be selected, rotating the wind turbine blades more into the wind. This will result in increased loads on the wind turbine which would not have been allowed at the initial setting. However, this is acceptable because it only occurs during a limited time interval.

Alternatively or additionally, the pitch control strategy of the wind turbine generator may be changed such that a cut-out wind speed of the wind turbine generator is extended. The cut-out wind speed is the wind speed at which the rotor of the wind turbine is stopped, by pitching the blades out of the wind, in order to avoid damage from high winds. By extending the cut-out wind speed of the wind turbine generator, it may be possible to extract power from the wind for a longer time at high wind speeds before the wind turbine blades are pitched out of the wind, and thereby boost the amount of produced power.

Thus, changing the pitch control strategy of the wind turbine generator is a suitable way of boosting the power output of the wind turbine generator.

Alternatively or additionally, the step of boosting the power output may comprise changing a generator control strategy. The purpose of the generator control strategy is to control a generator torque and/or a rotational speed of the generator in order to achieve a certain power output and follow a given power curve. The generator torque is the turning and twisting force acting over a generator shaft for a particular rotational speed, and the rotational speed of the generator is the angular speed at which the generator shaft turns. Thus, the power production can be controlled by appropriately controlling the torque and/or the rotational speed of the generator.

By changing the generator control strategy of the wind turbine generator, the generator torque is controlled in accordance with a changed torque-speed curve. For instance, a generator control strategy can be selected, in which the wind turbine generator is operated at an increased generator torque, thereby increasing the power production. In order to obtain this, a current fed to the rotor of the wind turbine generator may be increased, thereby increasing the magnetic field. The magnetic field exerts a torque which causes the generator shaft to turn, and thereby boosts the amount of produced power.

The power generating unit may form part of a renewable power plant comprising two or more renewable power generating units, the renewable power plant being coupled to a power grid. In the present context the term 'renewable power plant' should be interpreted to mean a collection of two or more renewable power generating units, such as wind turbines, photovoltaic cells, etc., arranged within a limited geographical area, and which may share various forms of infrastructure, such as access roads, communication network, substations, power electronics, grid connections, etc.

According to this embodiment, the forecasting of the accumulated power output of the power generating unit during the predefined time interval may be an expected power production of the individual power generating units of the renewable power plant. In this case, an accumulated power output is forecasted for each of the power generating units, and each of the power generating units is controlled to provide a power output which fulfils the forecasted accumulated power output for the respective power generating units.

Alternatively or additionally, the forecast of the accumulated power output of the power generating unit during the predefined time interval may an expected power production of the entire renewable power plant. In this case, an accumulated power output is forecasted for the entire renewable power plant, e.g. based on forecasts for the individual power generating units. The power generating units of the renewable power plant may then be controlled in such a manner that a total power output of the renewable power plant is obtained which fulfils the forecasted accumulated power output for the entire renewable power plant.

The renewable power plant may comprise a power plant controller, the power plant controller being configured to control the power output of the individual power generating units within the renewable power plant. Thus, the power plant controller is in communicative connection with each of the renewable power generating units. The power plant controller may further be in communicative connection with the power grid. The power plant controller may derive a control signal for each of the renewable power generating units, e.g. including a power setpoint, based on requirements from a power grid, and in order to ensure that the entire renewable power plant, i.e. all of the renewable power generating units in combination, fulfil the requirements of the power grid. Thus, the power plant controller ensures that the contributions from the individual power generating units sum up to the total required production of the renewable power plant.

When the renewable power generating plant comprises such a power plant controller, at least some of the method steps described above may advantageously be performed by the power plant controller. Thus, in this case, the power plant controller may, e.g., estimate the actual accumulated power output, based on the measured actual power output, compare this to the forecast and determine whether or not one or more power generating unit needs to be boosted. Furthermore, in the case that it is determined that one or more power generating units needs to be boosted, the power plant controller may advantageously select which power generating unit(s) to boost. Finally, the control signals generated by the power plant controller for the power generating units may include a boosting signal in the case that the power generating unit in question has been selected for boosting.

The method may further comprise the step of selecting one or more renewable power generating units being eligible for power boosting, and the step of boosting the power output of the power generating unit may only be performed if the power generating unit is selected as eligible for power boosting. According to this embodiment, only power generating units which have the necessary qualities or satisfy the necessary conditions are selected to provide a boosted power output. Thus, according to this embodiment, a forecasted accumulated power output for the renewable power plant can be reached by only boosting the power production of some of the power generating units.

The step of selecting one or more renewable power generating units may be based on fatigue levels of the power generating units. The fatigue level is a measure of weakness in materials caused by repeated variations of stress. Components which are subjected to repeated bending, such as rotor blades on a wind turbine generator, may eventually develop cracks which ultimately may cause the component to break. By selecting the renewable power generating units with the lowest fatigue levels first, it is ensured that the renewable power generating units with a higher fatigue levels do not wear out before their design lifetime.

For instance, in a renewable power plant comprising a plurality of wind turbine generators, the wind turbine generators may be exposed to winds from various directions. However, the wind turbine generators facing a dominating wind direction may typically be more loaded and have a higher fatigue level compared to the wind turbine generators in the remaining part of the renewable power plant, and in particular compared to wind turbine generators arranged away from a boundary of the renewable power plant, i.e. in a central part of the renewable power plant, since these wind turbine generators do not directly face the incoming wind, regardless of the wind direction. Thus, wind turbine generators in the central part of a renewable power plant may have fatigue levels, which are lower than the remaining part of the wind turbine generators in the renewable power plant. It may therefore be appropriate to select wind turbine generators which are not, at the present, facing the incoming wind for boosting.

Alternatively or additionally, the step of selecting one or more renewable power generating units may be based on a boosting history of the power generating units. For instance, power generating units which have not previously been selected for boosting, or which have been selected for boosting for a relatively short accumulated time, may be selected before power generating units which have been frequently selected for boosting in the past. Thereby it can be ensured that the additional loads caused by the boosting are appropriately shared among the power generating units of the renewable power plant, and thereby a more uniform wear and/or fatigue level of the power generating units may be obtained. For instance, it may be ensured that none of the power generating units are selected each time boosting is required.

Alternatively or additionally, the step of selecting one or more renewable power generating units may be based on the current power production of the power generating units. Renewable power generating units producing a high power output may already be close to their limit, whereas renewable power generating units producing a lower power output may be further away from their limit. Accordingly, increasing the power output of the renewable power generating units which are already producing a high power output may result in excessive wear on these power generating units, whereas this may not be the case if the power output of a renewable power generating unit which is currently producing low power output is increased.

The individual renewable power generating units may be chosen based on a priority list indicating the renewable power generating units being eligible for power boosting. The priority list may, e.g., be based on the remaining lifetime and/or the age of the renewable power generating unit, and may be made beforehand, i.e. before boosting is required. In this case the priority list is at hand when boosting is required. Thereby the power generating unit(s) to be boosted can readily be selected from the priority list immediately when it has been determined that boosting is required. The priority list may further be continuously updated during operation of the renewable power plant. For instance, the renewable power generating units that have been boosted and/or have a high fatigue level may be lower on the priority list compared to renewable power generating units that have not been boosted yet and/or have a lower fatigue level. The selection of the wind turbine generators for boosting may start from the highest ranked wind turbine generator to the lowest ranked wind turbine generator.

Therefore, in the case that boosting is required, it may be an advantage to select the renewable power generating units producing a lower power output for boosting, since these renewable power generating units may be able to increase their power output more before reaching their limit, without causing excessive wear. Thereby, the renewable power generating units producing a lower power output may be loaded more without decreasing the expected lifetime below the design lifetime.

The step of estimating the actual accumulated power output of the power generating unit may comprise estimating an accumulated power output at the end of the predefined time interval, given that the power output remains unchanged for the remaining part of the time interval. According to this embodiment, an accumulated power output is estimated, at a point in time during the predefined time interval, for the remaining part of the predefined time interval, wherein a constant power output is assumed for the remaining part of the predefined time interval. Thus, it is estimated what the expected accumulated power production will be at the end of the predefined time interval, if the power generating unit continues with the same power output during the remaining part of the predefined time interval, notably the power output which is currently produced, and taking the power which has already been produced into account. This is an easy and simple manner of estimating the actual accumulated power output.

Alternatively or additionally, the step of estimating the actual accumulated power output of the power generating unit may take known and expected changes in operating conditions into account. For instance meteorological conditions such as wind speed, wind direction, precipitation, etc., may make the estimation more accurate.

The step of deriving a difference between the forecasted accumulated power output and the estimated actual power output may comprise comparing an intermediate value of the forecasted accumulated power output at a specific point in time during the predefined time interval to an actual accumulated power output at the specific point in time. According to this embodiment, an actual accumulated power output which has already been produced at a specific point in time during the predefined time interval is compared to an intermediate value of the forecasted accumulated power output, corresponding to the same point in time. Thereby it can be derived whether or not the actual power production follows the forecast. Based on that, it can be determined whether or not it can be expected that the forecasted accumulated power output can be reached at the end of the predefined time interval.

The method may further comprise repeating the steps of measuring an actual power output of the power generating unit, estimating an actual accumulated power output and deriving a difference, and the method may further comprise the step of discontinuing the boosting of the power output in the case that the difference between the forecasted accumulated power output and the estimated actual accumulated power output falls below the predefined threshold value.

According to this embodiment, following a decision to boost the power production of the power generating unit, the actual power production is continued to be monitored, and a new estimated actual accumulated power output is derived at a later point in time, but before the end of the predefined time interval, in the manner described above, in order to evaluate whether or not boosting is still relevant.

Thus, if it turns out that the power production has been increased to a level where it is now likely that the forecasted accumulated power output can be reached, without the increased power production provided by the boosting, the boosting is discontinued. This is the case if the derived difference falls below the predefined threshold value. Thereby the fatigue load on the power generating unit is minimised.

Alternatively or additionally, the boosting of the power output of the power generating unit may simply be discontinued when the predefined time interval has lapsed.

Thus, by discontinuing the boosting of the power output of the power generating unit in the case that the difference falls below the predefined threshold value, it may be ensured that the power output of the power generating unit is only boosted when needed.

On the other hand, if it turns out that it is only likely to reach the forecasted accumulated power output if the boosted operation is continued, then the boosting is not discontinued. Furthermore, if the new accumulated power output is below the forecasted accumulated power output, even if it is assumed that the current boosting level is maintained, then it may be decided to increase the boosted power production. In the case that the power generating unit forms part of a renewable power plant, this may include selecting one or more further power generating units for boosting.

The method may further comprise the steps of:
receiving a signal indicating a need for increased supply of power to a power grid to which the power generating unit is connected, and
boosting the power output of the power generating unit in response to the received signal.

According to this embodiment, the power output of the power generating unit may further be boosted in response to a signal indicating a need for increased power supply to a power grid. The signal indicating a need for increased power supply may be a price signal indicating a price of power. A high price may indicate lack of power, while a low price may indicate a surplus of power. Thus, if the price signal increases above a certain threshold value, this may indicate a need for increased power supply which is sufficient to justify boosting of the power generating unit.

Alternatively or additionally, the power grid may provide the signal indicating a need for increased power supply in the case of a fault, a contingency in the power grid or a disconnection of one or more power generating units. Thereby, the power output of the power generating unit may be boosted, e.g., in the case that there is a loss of generation in the power grid in order to stabilise the power grid.

According to a second aspect, the invention provides a renewable power plant comprising a plurality of power generating units, coupled to a power grid, wherein each of the power generating units is adapted to provide a power output to the power grid, wherein the power output of at least one of the power generating units is controlled in accordance with a method according to the first aspect of the invention.

Thus, according to the second aspect, the invention provides a renewable power plant. In the present context the term 'renewable power plant' should be interpreted to mean a collection of two or more renewable power generating units, such as wind turbines, photovoltaic cells, etc., adapted to provide a power output to a power grid, arranged within a limited geographical area, and which may share various forms of infrastructure, such as access roads, communication network, substations, power electronics, grid connections, etc. The power outputs of the power generating units are controlled in accordance with a method according to the first aspect of the invention, i.e. in the manner described above. Accordingly, the remarks set forth above with reference to the first aspect of the invention are equally applicable here.

At least one of the power generating units may be a wind turbine generator. A wind turbine generator is a power generating unit that converts mechanical rotational power produced by the wind to electrical power. The wind turbine generator will normally have a tower carrying a nacelle, the nacelle carrying a rotor and a set of wind turbine blades mounted thereon. The nacelle may comprise electrical devices, such as a generator, power electronics, etc. The nacelle may further be mounted on top of the tower, but may also be mounted on other parts of the tower, e.g. in the case that the wind turbine is a multirotor wind turbine comprising two or more rotors. The wind turbine generator may be a stand alone wind turbine generator, or it may form part of a wind farm comprising two or more wind turbines generators.

Alternatively, the power generating unit may be in the form of another kind of renewable power generating unit, such as one or more photovoltaic cells, a hydroelectric generator, etc.

BRIEF DESCRIPTION OF THE DRAWINGS

The invention will now be described in further details with reference to the accompanying drawings, in which.

DETAILED DESCRIPTION OF THE DRAWINGS

Figure 1:
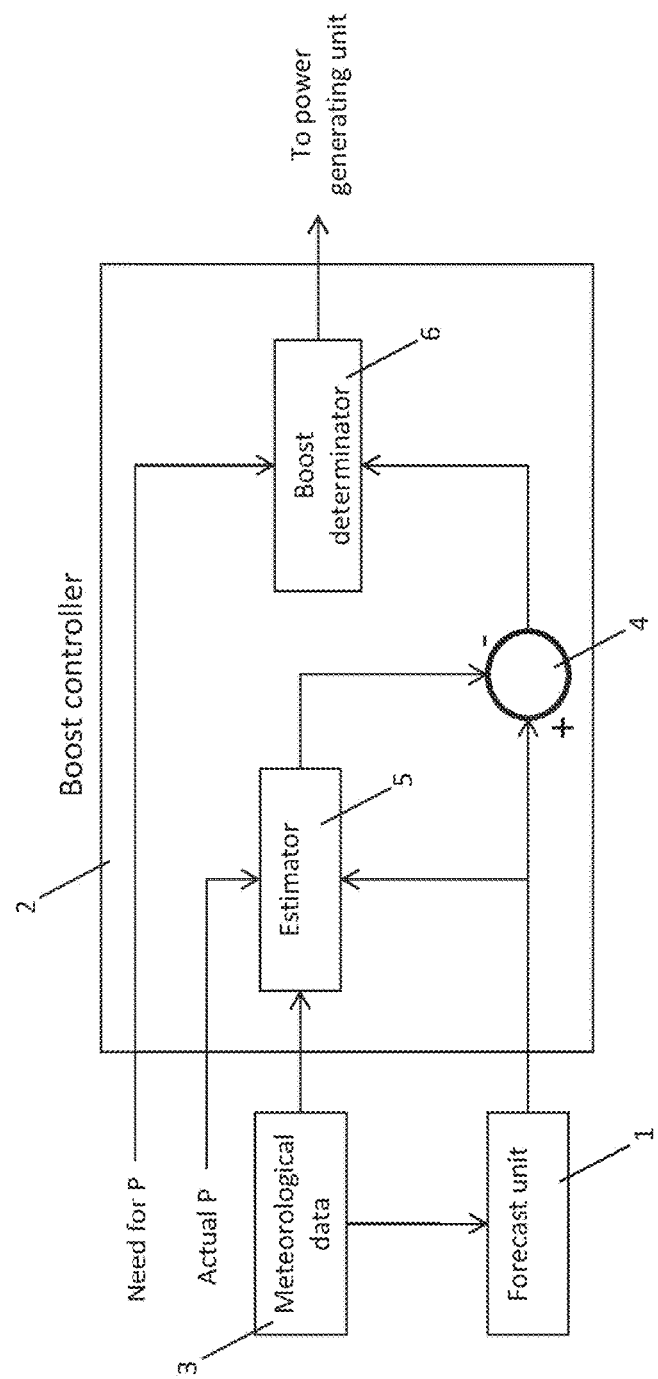
FIG. 1 is a block diagram illustrating a method according to an embodiment of the invention.

FIG. 1 is a block diagram illustrating a method according to an embodiment of the invention. A forecast unit 1 being in communicative connection with a boost controller 2 receives meteorological data 3, such as temperature, air pressure, humidity, precipitation, wind speed, wind direction, etc., in the vicinity of a power generating unit (not shown) being controlled in accordance with the method. Based thereon, the forecast unit 1 derives a forecast of an accumulated power output of the power generating unit during a predefined future time interval. The predefined time interval may be defined by different time scales, ranging from few minutes to several days. The forecasted accumulated power output is an estimate of an expected power production of a power generating unit during the predefined time interval. The forecast generated in this manner is supplied to a summing point 4 of the boost controller 2, and may further be supplied to an estimator 5 of the boost controller 2.

At the beginning of the predefined time interval, the power generating unit starts producing power. The actual power produced is monitored, and information regarding the produced power is supplied to the estimator 5. The estimator 5 is further provided with information related to meteorological data. Based on this information, the estimator 5 estimates an actual accumulated power output of the power generating unit during the predefined time interval. The estimated actual accumulated power output is an expected amount of total power the power generating unit is able to produce during the predefined time interval.

At any given time during the predefined time interval, an accumulated power, which has already been produced since the start of the predefined time interval can be derived from the measured actual power output of the power generating unit. The actual accumulated power output for the predefined time interval can then be estimated by estimating how much power the power generating unit is expected to produce during the remaining part of the predefined time interval and add this to the power which has already been produced.

The estimated actual accumulated power output is provided from the estimator 5 to the summing point 4, where the forecasted power output, which was provided by the forecast unit 1, and the estimated actual accumulated power output are compared in order to investigate whether or not it is likely that the forecasted accumulated power output is reached at the end of the predefined time interval.

The summing point 4 outputs an algebraic sum of the inputs, which is the difference between the forecasted accumulated power output and the estimated actual accumulated power output.

The difference is provided from the summing point 4 to a boost determinator 6 forming part of the boost controller 2. The difference is a measure of how much the expected total power production differs from the forecasted power production. Thus, the difference may give an indication of how far the estimated actual accumulated power output is from the forecasted accumulated power output, and thereby an indication regarding whether or not it may be expected to fulfil the forecast within the predefined time interval. Furthermore, the difference indicates whether the estimated accumulated power output is above or below the forecasted accumulated power output. Based on the difference, the boost determinator 6 determines whether or not the power output of the power generating unit should be boosted.

In the case that the estimated actual accumulated power output is larger than the forecasted accumulated power output, the expected total power production is above what was forecasted, and thus there is surplus of power production. Thus, unless something is changed, it may be expected that the power generating unit, at the end of the predefined time interval, has provided a total power output which is above what was forecasted, and thereby no boost signal will be sent to the power generating unit.

In the case that the estimated actual accumulated power output is below the forecasted accumulated power output, the expected total power production is below what was forecasted, and thus there is a deficiency in the power production, and the forecasted power output may not be met. This may lead to penalties, in particular if the difference is large. Therefore, if the difference signal indicates that the estimated actual accumulated power output is below the forecasted accumulated power output, and if the difference is larger than a predefined threshold value, the boost determinator 6 generates a boost signal and supplies this to the power generating unit in order to cause the power generating unit to boost its power production for the remaining part of the predefined time interval. Thereby the power production of the power generating unit is increased sufficiently to allow the forecasted accumulated power output to be reached.

The boost determinator 6 may further receive a signal indicating a need for power in the power grid. In the case that the signal indicates a need for power in the power grid, the boost determinator 6 may send a boost signal to the power generating unit, also causing the power generating unit to increase its power production. This may, e.g., be relevant in cases where a sudden need for power occurs. For instance, in the case of a fault, a contingency or a disconnection of one or more power generating units in the power grid, an imbalance between load and generation may occur. In such cases power from the power generating unit may be needed for stabilising the power grid, and therefore the power output of the power generating unit may be boosted.

Alternatively or additionally, the signal indicating a need for power in the power grid may be a price signal from an electricity market, indicating a price on the power. A high price may indicate lack of power, while a low price may indicate a surplus of power.

Figure 2:
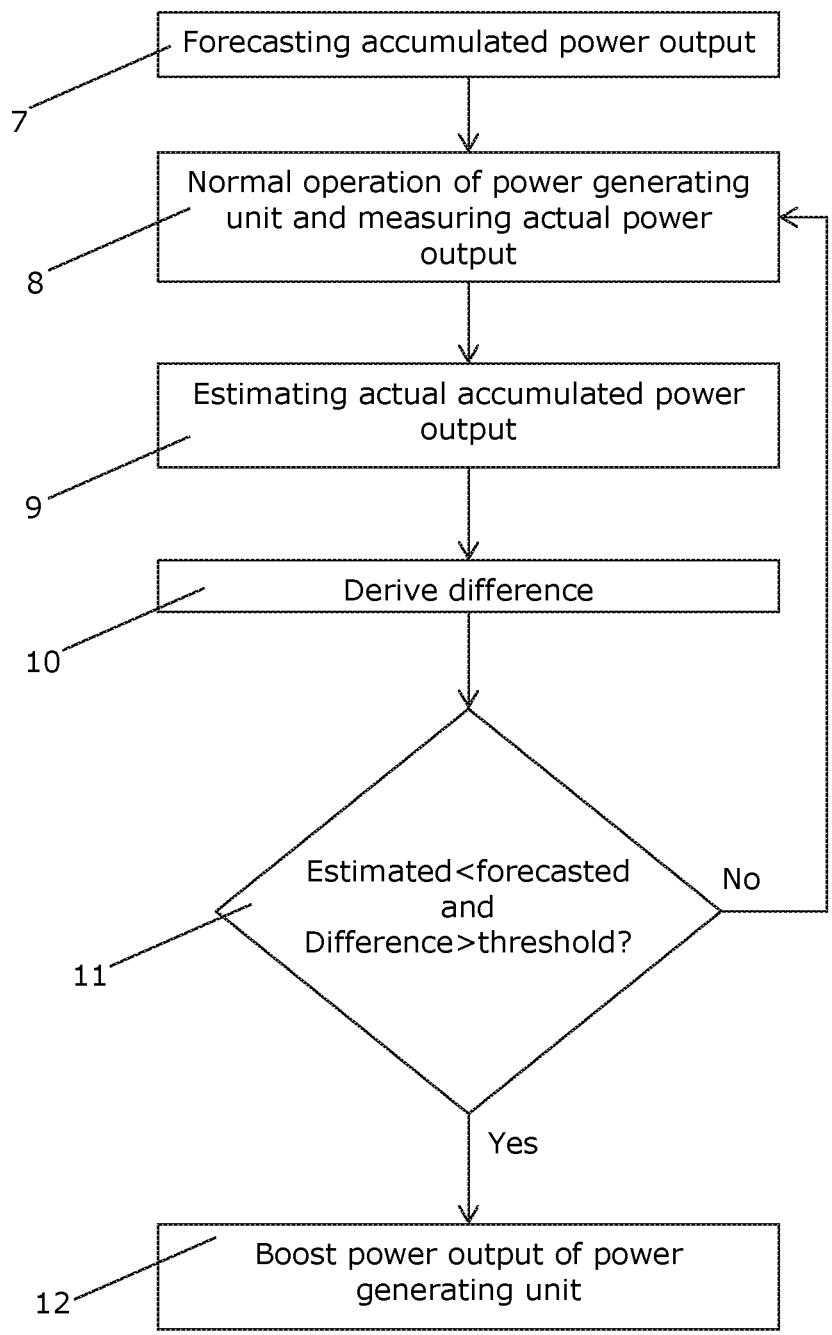
FIG. 2 is a flow chart illustrating a method according to an embodiment of the invention.

FIG. 2 is a flow chart illustrating a method according to an embodiment of the invention. The method is initiated at step 7, in which an accumulated power output of the power generating unit during a predefined time interval is forecasted. The forecasting of the accumulated power output may, e.g., be performed in the manner described above with reference to FIG. 1.

In step 8, the power generating unit is operated at normal conditions, e.g. following a design power curve. During this, an actual power output of the power generating unit is measured.

In step 9, an actual accumulated power output is estimated for the predefined time interval on the basis of the measured actual power output of the power generating unit. The estimation of the actual accumulated power output may be performed in the manner described above with reference to FIG. 1.

In step 10, a difference between the forecasted accumulated power output and the estimated actual accumulated power output of the power generating unit is derived. The difference may be derived in the manner described above with reference to FIG. 1.

In step 11, it is investigated whether the estimated actual accumulated power output is below the forecasted accumulated power output, and whether the difference between the forecasted accumulated power output and the estimated actual accumulated power output is above a threshold value. In the case that the actual accumulated power output is below the forecasted accumulated power output, and the difference is above the threshold value, this is an indication that the forecasted accumulated power output will not be reached at the end of the predefined time interval. Therefore, in this case the process is forwarded to step 12, where the power output of the power generating unit is boosted for the remaining part of the predefined time interval in order to ensure that the forecasted accumulated power output is reached. The boosting may, e.g., be obtained by operating the power generating unit in accordance with another power curve, which allows the power generating unit to operate above rated power.

In the case that step 11 reveals that the actual accumulated power output is above the forecasted accumulated power output, or that the difference between the forecasted accumulated power output and the estimated actual accumulated power output is below the threshold value, this is an indication that the forecasted accumulated power output is likely to be reached at the end of the predefined time interval, and there is therefore no need to boost the power production of the power generating unit. Therefore, in this case the process is returned to step 8 for continued operation at normal conditions.

Figure 3:
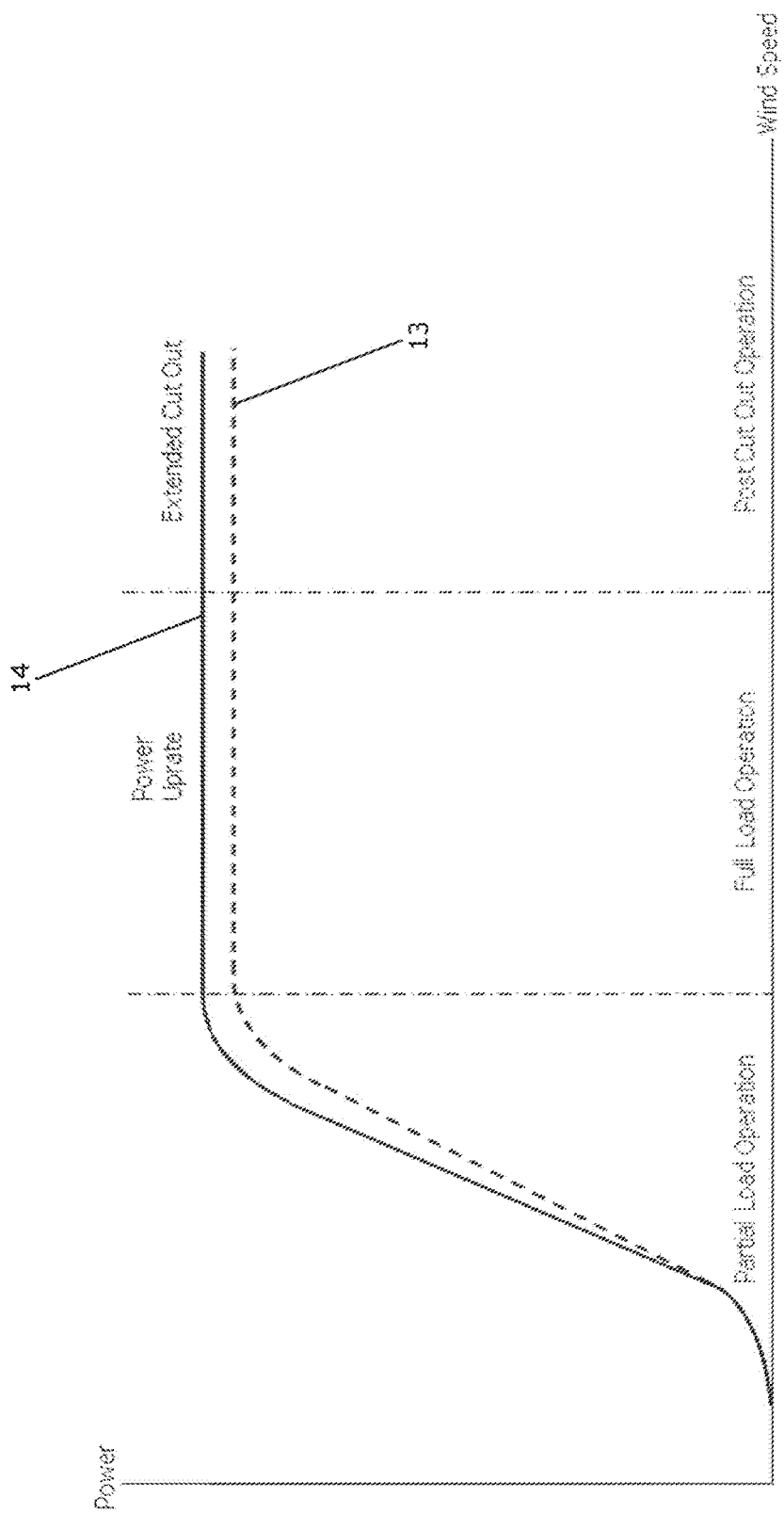
FIG. 3 shows two power curves for a wind turbine generator being operated in accordance with a method according to an embodiment of the invention.

FIG. 3 shows two power curves 13, 14 for a wind turbine generator being operated in accordance with a method according to an embodiment of the invention. One of the power curves 13 represents a design power curve for the wind turbine generator. Thus, at normal operating conditions, the wind turbine generator will be operated in accordance with the power curve 13.

The other power curve 14 represents a boosted power curve for the wind turbine generator. From FIG. 3, it can be seen that a higher power output is obtained when the wind turbine generator is operated according to the boosted power curve 14 than when the wind turbine generator is operated according to the normal power curve 13. This applies in the partial load region, below rated wind speed, as well as in the full load region, above rated wind speed.

The wind turbine generator may be able to shift between the normal power curve 13 and the boosted power curve 14. For instance, a wind turbine generator may follow the normal power curve 13 in, e.g., the partial load region, and then receive a boost signal indicating the power output of the wind turbine generator should be boosted. After receiving the boost signal, the wind turbine generator may shift to the boosted power curve 14, and control the power output of the wind turbine generator according to the boosted power curve 14. When no more boosting is required, the wind turbine generator may shift back to the normal power curve 13.

Figure 4:
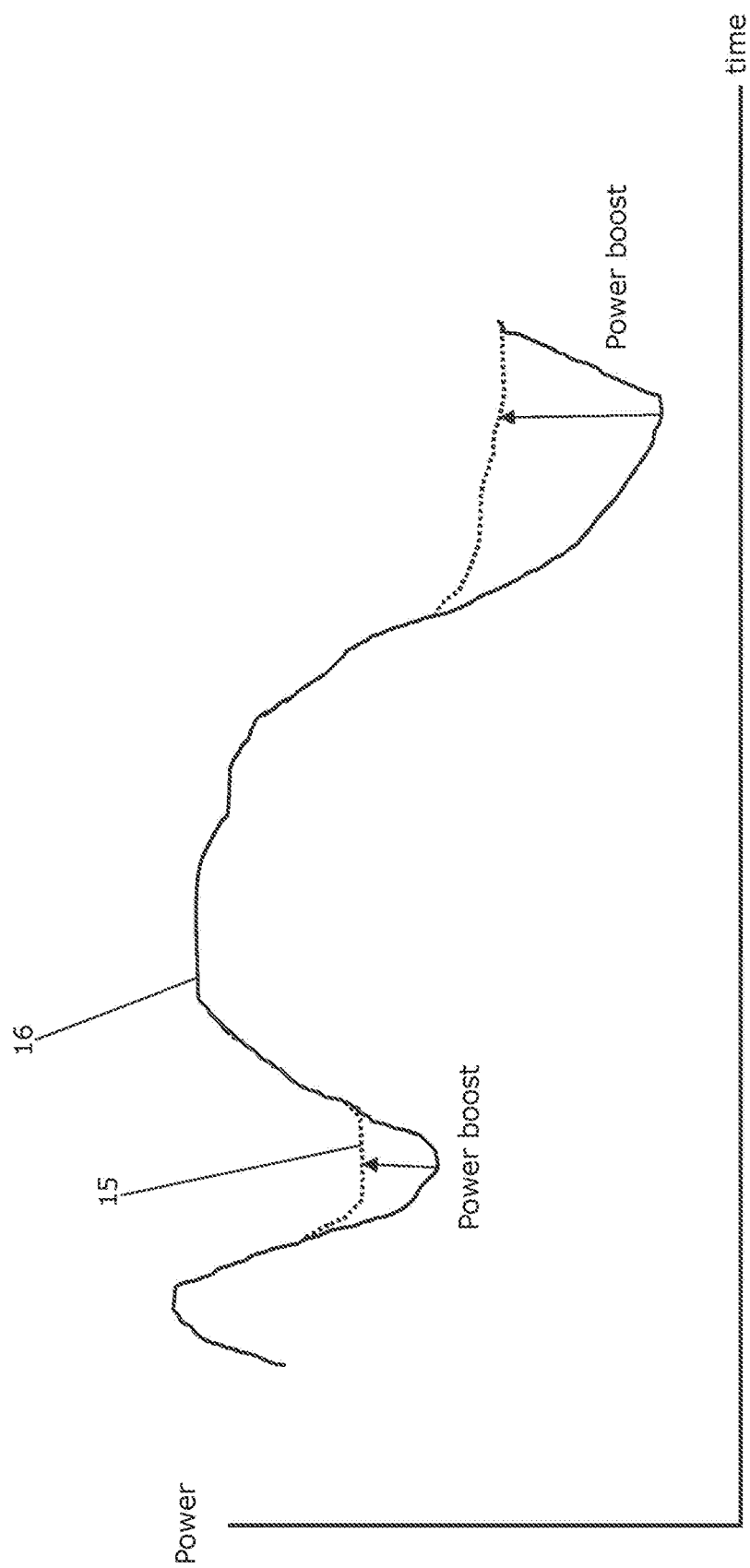
FIG. 4 illustrates power production of a power generating unit being operated in accordance with a method according to an embodiment of the invention, as a function of time.

FIG. 4 illustrates power production of a power generating unit being operated in accordance with a method according to an embodiment of the invention, as a function of time. The graph shows a solid line 16, representing operation of the power generating unit without boosting power production, and a dotted line 15 illustrating operation of the power generating with boosted power generation. It can be seen that the power production is boosted during time intervals where the power production would otherwise be low.

Figure 5:
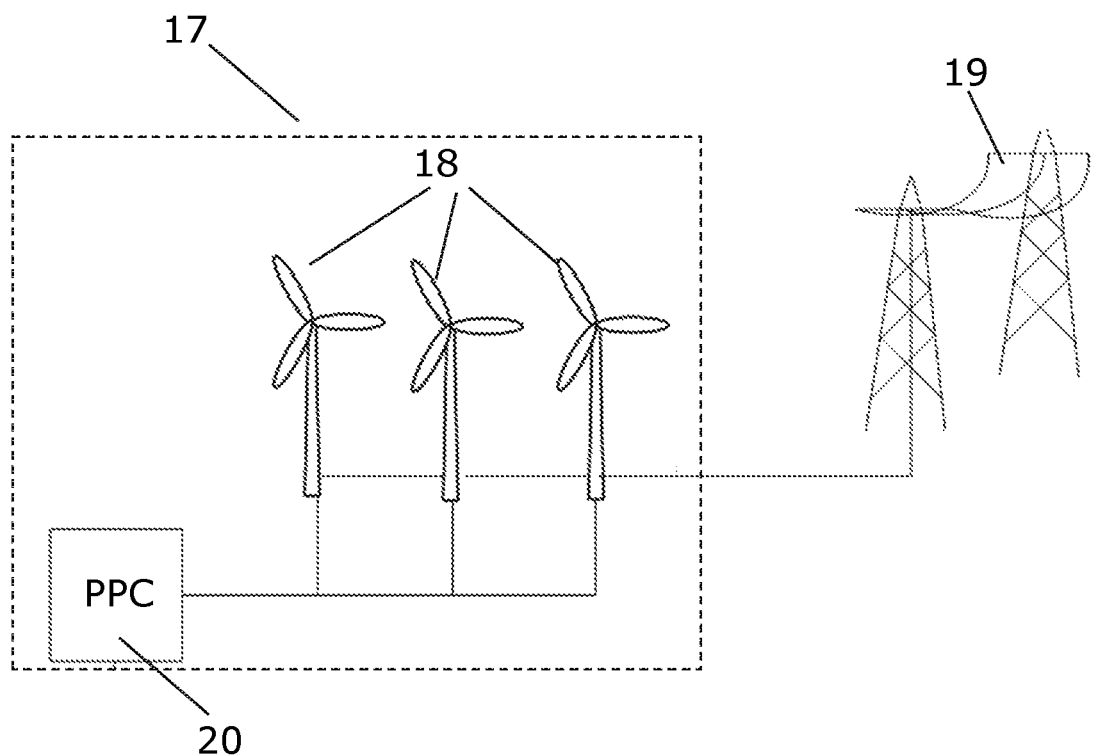
FIG. 5 illustrates a renewable power plant being operated in accordance with a method according to a first embodiment of the invention.

FIG. 5 illustrates a renewable power plant 17 being operated in accordance with a method according to a first embodiment of the invention. The renewable power plant 17 comprises a plurality of wind turbine generators 18, three of which are shown, and the renewable power plant 17 is connected to a power grid 19. The renewable power plant 17 further comprises a power plant controller 20, the power plant controller 20 being configured to derive a control signal for the individual wind turbine generators 18, e.g. including a power setpoint, based on requirements from the power grid 19 and on the basis of information provided by each of the wind turbine generators 18, in order to ensure that the entire renewable power plant 17, i.e. all of the wind turbine generators 18 in combination, fulfil the requirements of the power grid 19. Thus, the power plant controller 20 ensures that the contributions from the individual wind turbine generators 18 sum up to the total required production of the renewable power plant 17.

The power plant controller 20 performs at least some of the method steps of the claimed invention, i.e. it estimates actual accumulated power output, compares this to a forecast and determines whether or not one or more wind turbine generators 18 needs to be boosted. The power plant controller 20 further selects which of the wind turbine generators 18 to boost, and forwards a boost signal to the selected wind turbine generators 18. Thereby, obligations towards the power grid 19 may be fulfilled, and penalties may be avoided, as described above.

Figure 6:
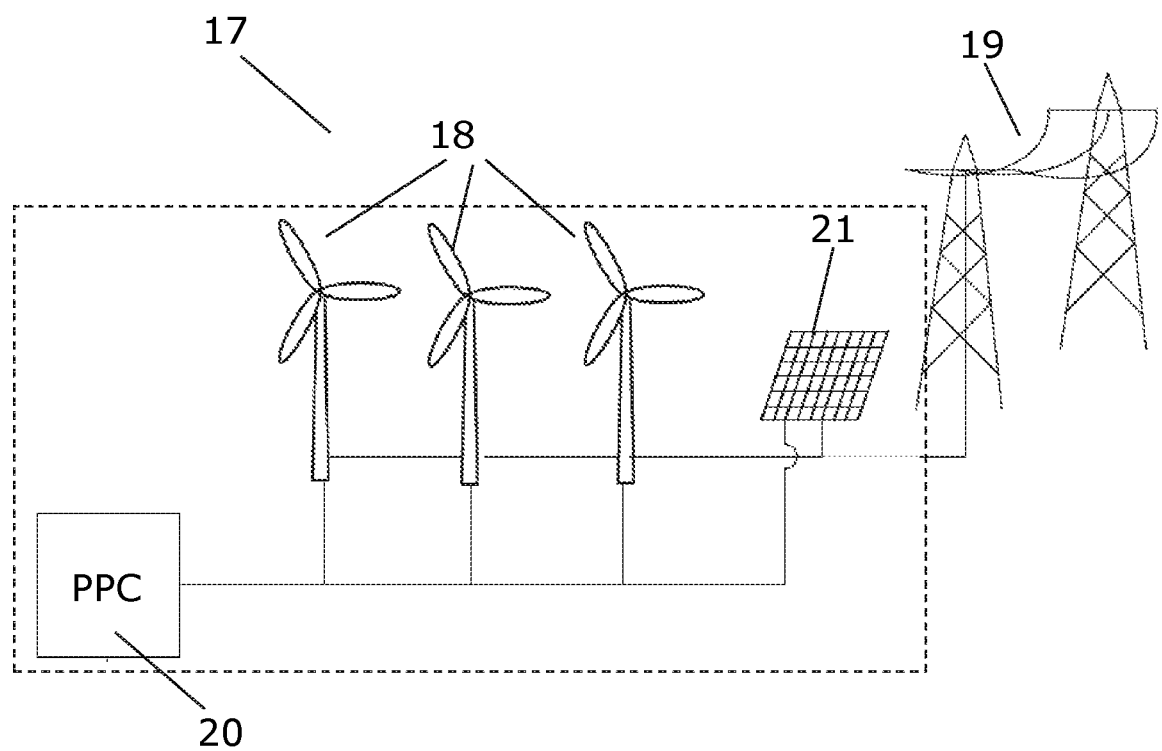
FIG. 6 illustrates a renewable power plant being operated in accordance with a method according to a second embodiment of the invention.

FIG. 6 illustrates a renewable power plant 17 being operated in accordance with a method according to a second embodiment of the invention. The renewable power plant 17 of FIG. 6 is very similar to the renewable power plant 17 of FIG. 5, and it will therefore not be described in detail here.

The renewable power plant 17 of FIG. 6 comprises two different types of renewable power generating units, i.e., wind turbine generators 18, as described above with reference to FIG. 5, and at least one photovoltaic cell 21. Thus, in the embodiment illustrated in FIG. 5, the power plant controller 20 provides control signals to the wind turbine generators 18 as well as to the photovoltaic cells 21, in the manner described above with reference to FIG. 5. Thus, in the case that it is determined that boosting is required, the power plant controller 20 has the option of selecting one or more of the photovoltaic cells 21 for boosting, if this is considered appropriate.

Figure 7:
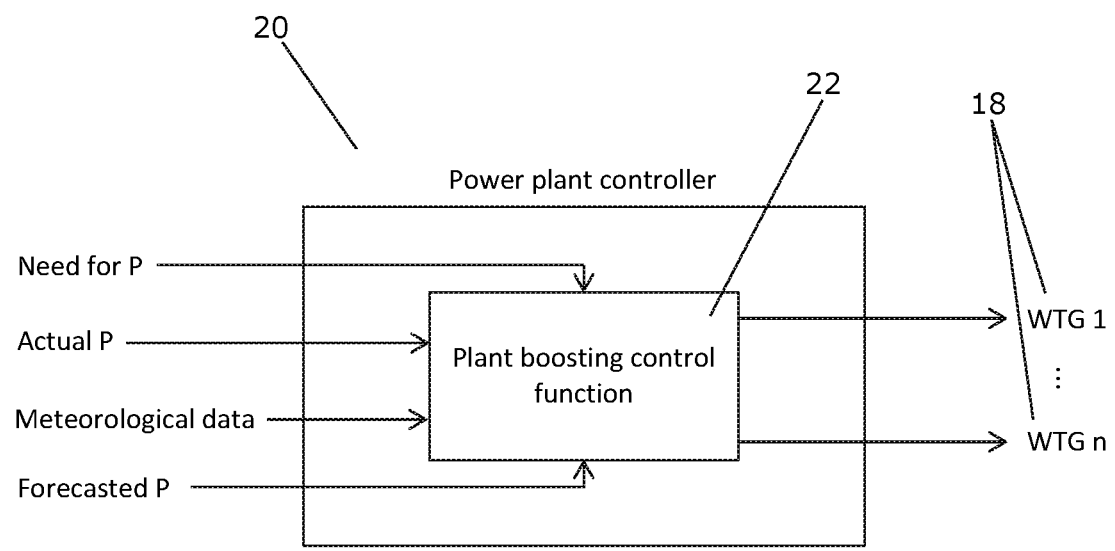
FIG. 7 is a block diagram illustrating a power plant controller for use in a method according to an embodiment of the invention.

FIG. 7 is a block diagram illustrating a power plant controller 20 for use in a method according to an embodiment of the invention. The power plant controller 20 of FIG. 7 could, e.g. be applied in the renewable power plants of FIGS. 5 and 6.

The power plant controller 20 comprises a plant boosting control function 22 that receives a number of input data in the form of a need for power in the power grid, actual measured power output of a number of renewable power generating units, in the form of wind turbine generators 18, meteorological data, such as temperature, air pressure, humidity, precipitation, wind speed, wind direction etc., in the vicinity of the renewable power plant, and a forecast of an accumulated power output of the renewable power plant during a predefined future time interval.

The boosting control function 22 processes the received data, e.g. in the manner described above with reference to FIG. 1, and derives a control signal for each of the wind turbine generators 18 within the renewable power plant, the control signal indicating whether the power output of the individual renewable power generating units should be boosted or not. Depending on the amount of boosting required, the power plant controller 20 may boost the power output of one or more of the wind turbine generators 18 within the renewable power plant in order to avoid forecast errors at renewable power plant level, as described above.

The power plant controller 20 can select which wind turbine generator(s) 18 to boost, and the level of boosting for the selected wind turbine generator(s) 18. In the case that two or more wind turbine generators 18 are selected for boosting, the boosting levels may be the same for the selected wind turbine generators 18, or they may differ from one wind turbine generator 18 to another. The selection of the wind turbine generator(s) 18 may be based on, e.g., the age and/or fatigue level of the individual wind turbine generators 18.

The invention claimed is:

1. A method for controlling a power output of a power generating unit, the method comprising:
   forecasting an amount of power that the power generating unit will output during a predefined time interval;
   measuring an amount of power output by the power generating unit from a beginning of the predefined time interval to a point in time prior to an end of the predefined time interval;
   prior to the end of the predefined time interval, estimating, based on the measured amount of power and a constant power output from the point in time until the end of the predefined time interval, an amount of power that the power generating unit will output from the beginning of the predefined time interval to the end of the predefined time interval;

deriving a difference between the forecasted amount of power and the estimated amount of power; and boosting the power output of the power generating unit based on (i) the estimated amount of power falling below the forecasted amount of power and (ii) the difference between the forecasted amount of power and the estimated amount of power being larger than a predefined threshold value.

2. The method of claim 1, wherein the power generating unit is a wind turbine generator.

3. The method of claim 2, wherein forecasting the amount of power that the power generating unit will output during the predefined time interval is based on meteorological forecasts at a position of the wind turbine generator.

4. The method of claim 2, wherein boosting the power output comprises changing a pitch control strategy of the wind turbine generator.

5. The method of claim 2, wherein boosting the power output comprises changing a generator control strategy.

6. The method of claim 1, wherein the power generating unit forms part of a renewable power plant comprising two or more renewable power generating units, the renewable power plant being coupled to a power grid.

7. The method of claim 6, further comprising selecting one or more renewable power generating units being eligible for power boosting, and wherein boosting the power output of the power generating unit is performed only if the power generating unit is selected as eligible for power boosting.

8. The method of claim 1, wherein deriving the difference comprises comparing an intermediate value of the forecasted amount of power at a specific point in time during the predefined time interval to an actual power output at the specific point in time.

9. The method of claim 1, further comprising discontinuing the boosting of the power output when the difference between the forecasted amount of power and the estimated amount of power falls below the predefined threshold value.

10. The method of claim 1, further comprising:
receiving a signal indicating a need for increased supply of power to a power grid to which the power generating unit is connected; and
boosting the power output of the power generating unit in response to the received signal.

11. A renewable power plant, comprising:
a plurality of power generating units, coupled to a power grid, wherein each of the power generating units is adapted to provide a power output to the power grid; and
a controller operable to control the power output of at least one of the power generating units according to an operation comprising:
forecasting an amount of power that the power generating unit will output during a predefined time interval;
measuring an amount power output by the power generating unit from a beginning of the predefined time interval to a point in time prior to an end of the predefined time interval;
prior to the end of the predefined time interval, estimating, based on the measured amount of power and a constant power output from the point in time until the end of the predefined time interval, an amount of power that the power generating unit will output from the beginning of the predefined time interval to the end of the predefined time interval;
deriving a difference between the forecasted amount of power and the estimated amount of power; and
boosting the power output of the power generating unit based on (i) the estimated amount of power falling below the forecasted amount of power and (ii) the difference between the forecasted amount of power and the estimated amount of power being larger than a predefined threshold value.

12. The renewable power plant according to claim 11, wherein at least one of the power generating units is a wind turbine generator.

13. The renewable power plant according to claim 12, wherein forecasting the amount of power that the power generating unit will output during the predefined time interval is based on meteorological forecasts at a position of the wind turbine generator.

14. The renewable power plant according to claim 12, wherein boosting the power output comprises changing a pitch control strategy of the wind turbine generator.

15. The renewable power plant according to claim 12, wherein boosting the power output comprises changing a generator control strategy.

* * * * *